Dec. 31, 1935.  G. METZ  2,026,053
SLED
Filed July 12, 1935
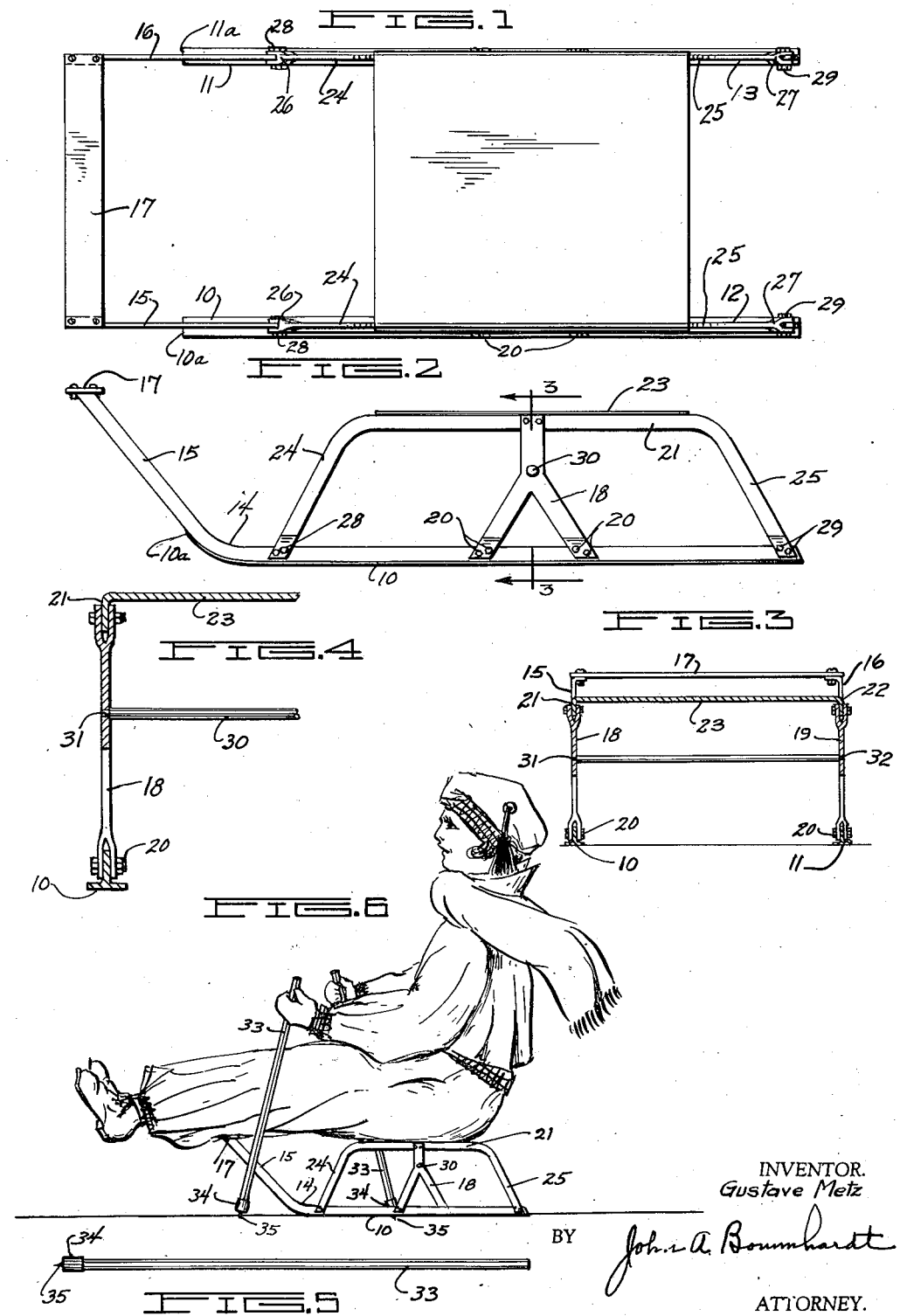
INVENTOR.
Gustave Metz
BY John A. Bornhardt
ATTORNEY.

Patented Dec. 31, 1935

2,026,053

UNITED STATES PATENT OFFICE 2,026,053

SLED

Gustave Metz, Cleveland, Ohio

Application July 12, 1935, Serial No. 31,048

2 Claims. (Cl. 280—12)

This invention relates to sleds primarily intended for amusement of children although also capable of use by adults.

One of the objects of the invention is to provide a sled that is sturdy in structure capable of withstanding all kinds of hard usage, comprising few parts and a sled that can be economically manufactured.

In the accompanying drawing:

Fig. 1 is a top plan view of the sled.

Fig. 2 is a side elevation.

Fig. 3 is a section taken on lines 3—3 of Fig. 2.

Fig. 4 is an enlarged fragmentary portion of Fig. 3.

Fig. 5 is a propelling stick.

Fig. 6 is a side elevation showing method of operation.

Referring to the drawing: a pair of runners 10 and 11 with center flanges 12 and 13 are curved upward at 14 to form the supporting members 15 and 16 for the leg rest 17, said runners 10 and 11 ending at 10a and 11a respectively.

A pair of inverted Y yoke supports 18 and 19 are superimposed over the center flanges 12 and 13 and bolted in place by bolts 20 as shown specifically in Figs. 2, 3 and 4.

The upper ends of the inverted Y supports are attached in a similar manner to the center of the seat flanges 21 and 22 of the seat 23, said flanges 21 and 22 being extended at front and rear and curving downward both in front and in back of said seat 23 forming legs 24 and 25 respectively to each flange 21 and 22, said legs 24 ending in yokes or forks 26 and legs 25 ending in yokes 27. The leg yokes 26 are superimposed over the center flanges 12 and 13 forward of the inverted Y yoke supports 18 and 19 and bolted in place by bolts 28. Leg yokes 27 are attached in a similar manner to the center flanges 12 and 13 but rearward of the inverted Y yoke supports 18 and 19 and bolted in place by bolts 29.

A cross bar 30 is inserted in apertures 31 and 32 in the inverted Y yoke 18 and 19 respectively.

A pair of propeller sticks 33 having metal heads 34 with prongs 35 projecting from the center thereof provides the means whereby the sled is propelled over the ice and snow as is illustrated by Fig. 6.

It will be seen that the sled is particularly well adapted for all-metal construction, the main parts being stamped out of sheet or angle metal and pressed to shape. This cheapens construction and makes a strong and durable sled. The seat is particularly well supported against fore and aft shocks and strains and the yokes or forks are capable of being securely bolted to the flanges of the seat and runners.

I claim:

1. A sled comprising a pair of runners having upstanding flanges along the same, a metal seat having depending flanges extended and curved downwardly at front and rear to connect with the flanges of the runners, and intermediate supports under the seat, said supports having forked ends embracing and secured to the flanges of the runners and seat respectively.

2. A sled as in claim 1, and a cross bar between said supports.

GUSTAVE METZ.